(12) United States Patent
Lang et al.

(10) Patent No.: US 8,272,926 B2
(45) Date of Patent: Sep. 25, 2012

(54) SYSTEM AND METHOD FOR STUNNING POULTRY WITH GAS

(75) Inventors: Gary Dee Lang, Naperville, IL (US); Narsimha R. Nayini, Burr Ridge, IL (US)

(73) Assignee: Praxair Technology, Inc., Danbury, CT (US)

( * ) Notice: Subject to any disclaimer, the term of this patent is extended or adjusted under 35 U.S.C. 154(b) by 469 days.

(21) Appl. No.: 11/893,331

(22) Filed: Aug. 15, 2007

(65) Prior Publication Data

US 2008/0051019 A1   Feb. 28, 2008

Related U.S. Application Data

(63) Continuation-in-part of application No. 11/508,703, filed on Aug. 23, 2006.

(60) Provisional application No. 60/922,859, filed on Apr. 11, 2007.

(51) Int. Cl.
*A22B 3/00* (2006.01)
*A22C 21/00* (2006.01)

(52) U.S. Cl. .......................... 452/66; 452/57

(58) Field of Classification Search .............. 452/57–61, 452/66
See application file for complete search history.

(56) References Cited

U.S. PATENT DOCUMENTS

| | | | |
|---|---|---|---|
| 2,526,037 A | 10/1950 | Murphy | |
| 2,737,683 A | 3/1956 | Regensburger | |
| 3,487,497 A * | 1/1970 | Wichmann et al. | 452/53 |
| 3,548,447 A * | 12/1970 | Price, Jr. | 452/52 |
| 3,828,396 A * | 8/1974 | Wernberg | 452/66 |
| 4,107,818 A * | 8/1978 | Scott et al. | 606/1 |
| 4,888,855 A | 12/1989 | Haumann | |
| 5,112,270 A | 5/1992 | Howard | |
| 5,152,714 A | 10/1992 | Audsley | |
| 5,186,677 A | 2/1993 | Christensen | |
| 5,435,776 A | 7/1995 | Owen | |
| 5,487,699 A | 1/1996 | Tyrrell | |
| 5,643,072 A | 7/1997 | Lankhaar | |
| 5,653,629 A | 8/1997 | Audsley | |
| 5,788,564 A | 8/1998 | Chamberlain | |
| 5,975,029 A * | 11/1999 | Morimoto et al. | 119/843 |
| 6,056,637 A | 5/2000 | Freeland | |
| 6,126,534 A | 10/2000 | Jacobs | |
| 6,135,872 A | 10/2000 | Freeland | |
| 6,174,228 B1 | 1/2001 | Grimsland | |
| 6,623,347 B1 | 9/2003 | Grimsland | |
| 6,694,918 B2 | 2/2004 | Draft | |
| 6,848,987 B2 | 2/2005 | Draft | |
| 7,097,552 B2 * | 8/2006 | Ovesen et al. | 452/66 |
| 2003/0168019 A1 | 9/2003 | Draft | |

(Continued)

FOREIGN PATENT DOCUMENTS

JP   62-282535   12/1987

(Continued)

*Primary Examiner* — David Parsley
(74) *Attorney, Agent, or Firm* — Robert J. Hampsch

(57) ABSTRACT

System and method for controlled atmosphere stunning of chickens in a batch mode is provided. The disclosed method includes the steps of: loading one or more batches of chickens in a stunning chamber and sealably enclosing the stunning chamber to isolate the atmosphere therein. Carbon dioxide is then introduced to the isolated atmosphere in a series of three, four or five phases to humanely stun the chickens. The carbon dioxide containing atmosphere is subsequently forcibly exhausted from the stunning chamber and the ranks of cages or modules containing the stunned chickens are advanced to the tipper or dumping station.

9 Claims, 5 Drawing Sheets

U.S. PATENT DOCUMENTS

| | | |
|---|---|---|
| 2004/0038638 A1 | 2/2004 | Ochten |
| 2004/0102147 A1 | 5/2004 | Draft |
| 2005/0164621 A1* | 7/2005 | Christensen .................. 452/57 |
| 2005/0191953 A1 | 9/2005 | Ovesen et al. |
| 2006/0009142 A1* | 1/2006 | Cattaruzzi .................. 452/66 |

FOREIGN PATENT DOCUMENTS

WO    WO 2007/008536 A1    1/2007

* cited by examiner

SYSTEM AND METHOD FOR STUNNING POULTRY WITH GAS

CROSS REFERENCE TO RELATED APPLICATIONS

This application claims priority to U.S. provisional patent application Ser. No. 60/922,859 filed Apr. 11, 2007 and is a continuation-in-part application of U.S. patent application Ser. No. 11/508,703 filed Aug. 23, 2006, the disclosures of which are incorporated by reference herein.

FIELD OF THE INVENTION

The present invention relates to methods and systems useful for controlled atmosphere stunning of poultry prior to their slaughter.x

BACKGROUND OF THE INVENTION

Commercial production of poultry products destined for sale for consumption customarily is carried out in large processing plants. Presently, in many current processing plants, poultry is typically brought in by truck in cages from which the poultry are off-loaded from the truck in the cages and subsequently dumped for further processing. The live poultry are then hung upside-down on a conveyorized shackle line and their heads are dragged through a brine or water bath. They are then stunned using high voltage electricity just prior to being slaughtered.

Hanging the birds while they are still fully awake can be very troublesome, leading to high labor costs and worker injuries. It is not unusual for the birds to flap their wings, causing joint damage and blood clots in the birds, thus degrading the overall quality of the meat and reducing the yield.

Stunning the poultry with gas as part of the processing regimen presents the advantage that the birds are less likely to engage in extensive movement, thereby reducing the burden to the worker and reducing the risk of damage to the bird. However, current gas stunning systems are complicated and expensive. In particular, existing poultry stunning systems often involve high capital costs and require significant changes to the processor's existing infrastructure and operational footprint. In addition, implementation and start-up of the many existing poultry stunning systems at a typical processor site also typically involves significant disruption and downtime of the processor's operation.

Thus, there is a need for a humane controlled atmosphere poultry stunning system capable of improving product quality and minimizing product yield losses, without incurring the complexity and expense of current gas stunning methods and apparatus.

SUMMARY OF THE INVENTION

In a broad aspect, the invention may be characterized as a method for controlled atmosphere stunning of poultry comprising the steps of: (i) loading one or more batches of poultry in a stunning chamber; (ii) sealably enclosing the one or more batches of poultry in the stunning chamber to isolate the atmosphere proximate the poultry; (iii) introducing a gaseous mixture to the isolated atmosphere to stun the one or more batches of poultry; (iv) forcibly exhausting the gaseous mixture from the isolated atmosphere; and (v) advancing the stunned poultry from the stunning chamber to a processing area.

In another aspect, the invention may be characterized as a system for controlled atmosphere stunning of poultry comprising: a stunning chamber having an entrance and an exit, the stunning chamber defining an isolated atmosphere; a gas introduction subsystem adapted to introduce prescribed levels of carbon dioxide into the isolated atmosphere in the stunning chamber; an atmosphere re-circulating subsystem adapted to recirculate the isolated atmosphere within the stunning chamber; an exhaust subsystem adapted to evacuate the carbon dioxide from the stunning chamber; and a control system adapted to control the operation of the atmosphere recirculating subsystem, the gas introduction subsystem, and the exhaust subsystem.

BRIEF DESCRIPTION OF THE DRAWINGS

The above and other aspects, features, and advantages of the present invention will be more apparent from the following, more descriptive description thereof, presented in conjunction with the following drawings, wherein.

DETAILED DESCRIPTION OF THE INVENTION

Figure 1:
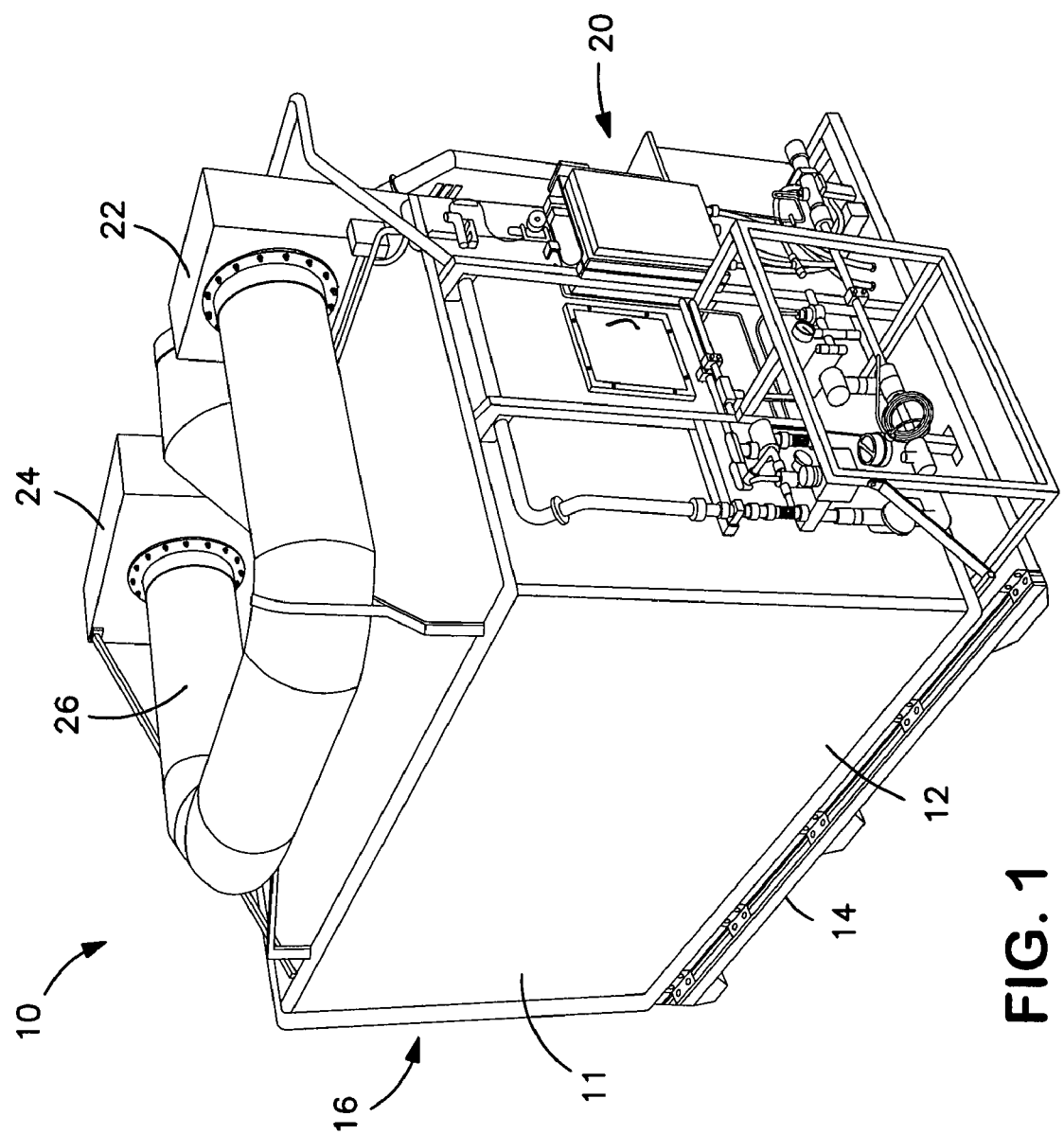
FIG. 1 is a perspective view of a single unit poultry stunning chamber according to one embodiment of the invention.

The poultry that are to be treated by the system and method of the present invention are transported to a treatment location from another location, preferably from a location at which the poultry have been placed into cages or otherwise confined. Then, the cages are transported to the treatment location, such as on a truck or other vehicle. Preferably, the cages or other structure that confines the poultry are of the conventional design that contains the poultry and prevents it from escaping, and that permits gaseous atmosphere to pass from outside the cage into and through the cage. Preferably, the tops, bottoms and sides of the cages are planar, to facilitate stacking them onto a vehicle during transportation and loading the rank of cages via a forklift or other machinery into a stunning chamber. As used herein, a "rank" of cages means a plurality of aligned or stacked cages and includes without limitation one cage, or two or more cages stacked vertically, or two or more vertical stacks of cages placed side by side (whether touching each other or not).

The caged poultry arrive at the treatment location alive typically via truck. As the poultry arrive at the treatment or processing location they are in, and breathing, an ambient atmosphere, typically ambient air. The poultry are then unloaded from the truck while still in cages and the ranks are placed on a platform or in a housing. Next, steps are taken so that the atmosphere surrounding the poultry on the platform or in the housing is isolated and the composition of the isolated atmosphere that the poultry are breathing changes to a composition that, when breathed, brings the poultry to a state of lethargy, unconsciousness, and/or unrecoverable. It will of course be recognized that poultry may pass through one of these states to the next. The terms "stunning" and "stun" are used herein to mean bringing the poultry into a desired state of lethargy, unconsciousness or unrecoverable through asphyxiation.

The composition of the isolated atmosphere being breathed by the poultry is changed so that the oxygen content of that atmosphere is decreased. Changing the composition can be carried out in many different ways. A feature common to the disclosed embodiments is that the gas composition changes and the poultry are subjected to breathing the composition, while the poultry remain confined on the platform or in the housing.

To bring about the desired change in the composition of the atmosphere to which the poultry are exposed, a gaseous component or a mixture of gaseous components is fed into the isolated atmosphere to which the poultry are exposed. The component or mixture changes the composition of the atmosphere being breathed by the poultry to a composition with decreased oxygen content, so that breathing it brings the poultry breathing it to the desired state of lethargy, unconsciousness or unrecoverable.

The gaseous component or mixture of components fed into the circulating atmosphere should not themselves be toxic to the animal but inert, bringing about the desired state by gradually asphyxiating the bird i.e. by reducing the oxygen content of the atmosphere that the bird breathes. Suitable gases include carbon dioxide, nitrogen, argon, and mixtures thereof. It should be noted that the gas or mixture of gases being added can be oxygen-free or can contain oxygen, so long as the overall oxygen content of the atmosphere being breathed decreases.

When the poultry being exposed to the circulating atmosphere has reached the desired state of lethargy, unconsciousness or lifelessness, addition of gas can be discontinued. The isolated atmosphere surrounding the poultry is then forcibly exhausted and replaced with ambient air. The ranks of cages with stunned poultry is then advanced from the housing to a tipper, where the birds are 'dumped' or 'tipped' out of the cages for further processing. Advancing the cages may be accomplished via fork lift, movement of the cages along a roller platform, movement of the cages along a conveyor system or other means for physically moving the cages from the stunning chamber to an alternate location.

Turning now to the Figures, and in particular FIG. 1, there is shown a perspective view of a single unit poultry stunning chamber (10) according to one embodiment of the invention. As seen therein, the poultry stunning chamber (11) includes an enclosure (12) having a base (14) and a door (16) through which the cages or rank of cages are loaded into and removed from the stunning chamber (11). Although not shown in detail, the disclosed stunning chamber includes a fresh air intake duct (22), and exhaust duct (24), a source of stunning gas, an injector or other means for introducing the stunning gas into the stunning chamber (11) and a fan for re-circulating the stunning gas within a recirculating circuit (26) and back into the main stunning chamber (11). When the multi-phase stunning treatment is complete, the chicken stunning system (10) activates various flow dampers such that fresh make-up air is introduced into the main stunning chamber (11) while the stunning gas is forcibly exhausted. The illustrated system (10) also includes a control system (20) and panel including appropriate shut-off and flow control valves to facilitate the automatic control of the stunning system (10).

Figure 2:
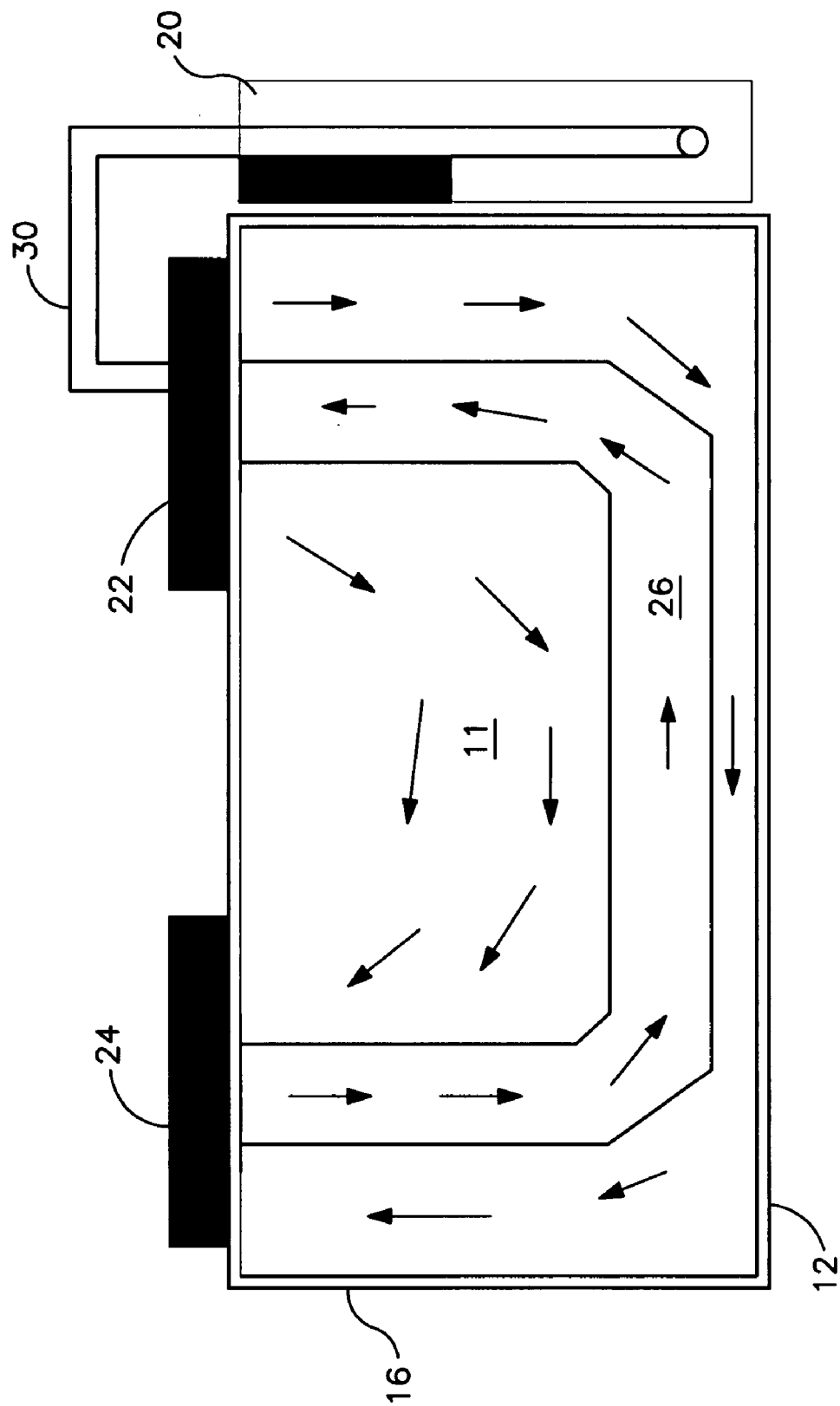
FIG. 2 is a top cross-sectional view of the stunning chamber of FIG. 1 depicting the re-circulating gas flow thru the stunning chamber.

FIG. 2 depicts a top view of the stunning system of FIG. 1 depicting partial cut-away views of the stunning system housing/enclosure (12) and door (16) as well as partial views of the intake duct (22) and exhaust duct (24). Arrows represent the re-circulating gas flow thru the main stunning chamber (11) and recirculating circuit (26).

Figure 3:
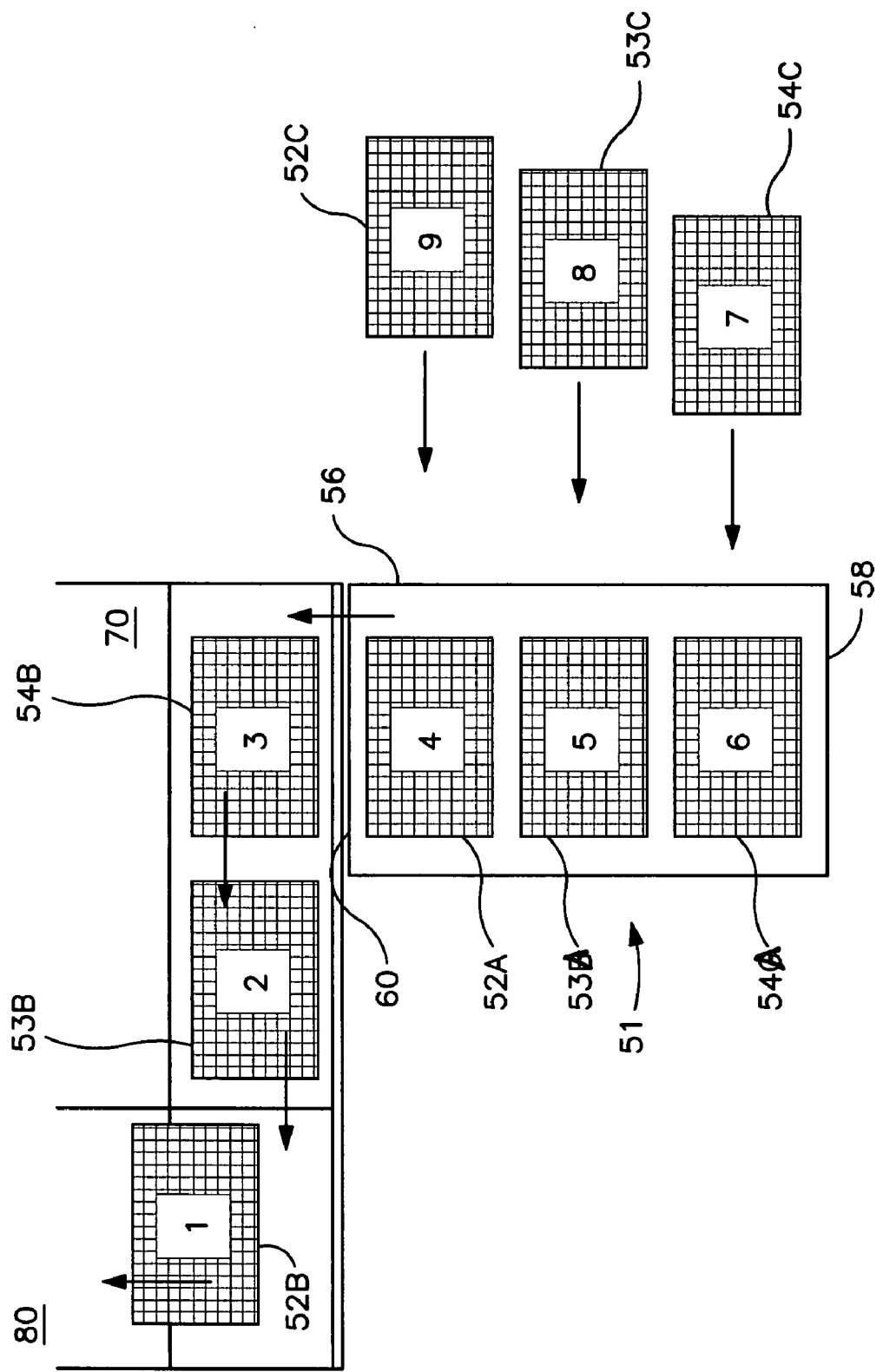
FIG. 3 is a schematic view of a multi-unit poultry stunning system according to another embodiment of the invention.

FIG. 3 is a schematic top view of a multi-unit poultry stunning system according to another embodiment of the invention. As illustrated therein, three modules or ranks of cages are depicted in the multi-unit stunning chamber (51). These three modules (52A,53A,54A) were loaded into the multi-unit stunning chamber (51) via the front loading door (56) on the front of the housing (58). After loading, the front loading door (56) is closed and the multi-phase stunning operation begins. Upon completion of the multi-phase stunning operation, the side door (60) to the stunning chamber (51) opens and the three modules (52A,53A,54A) are advanced to a staging area (70) and subsequently to the tipper (80) where the chickens or other poultry are dumped from their cages.

In the depicted embodiment of FIG. 3, each of the three modules (52A,53A,54A) containing stunned birds are successively advanced out from the stunning chamber (51) to the staging area (70) where the modules (52B,53B,54B) are moved laterally along the staging area (70) and ultimately to the tipper (80) or dumping station. As each of the modules containing the stunned birds are removed from the stunning chamber (51) via the side door (60), new modules (52C,53C, 54C) containing live, unstunned birds are loaded into the stunning chamber (51) via the front loading door (56). In this manner, three modules (i.e. batches) of birds are being stunned simultaneously and concurrently with post stunning processing of the birds in the preceding three modules.

Figure 4:
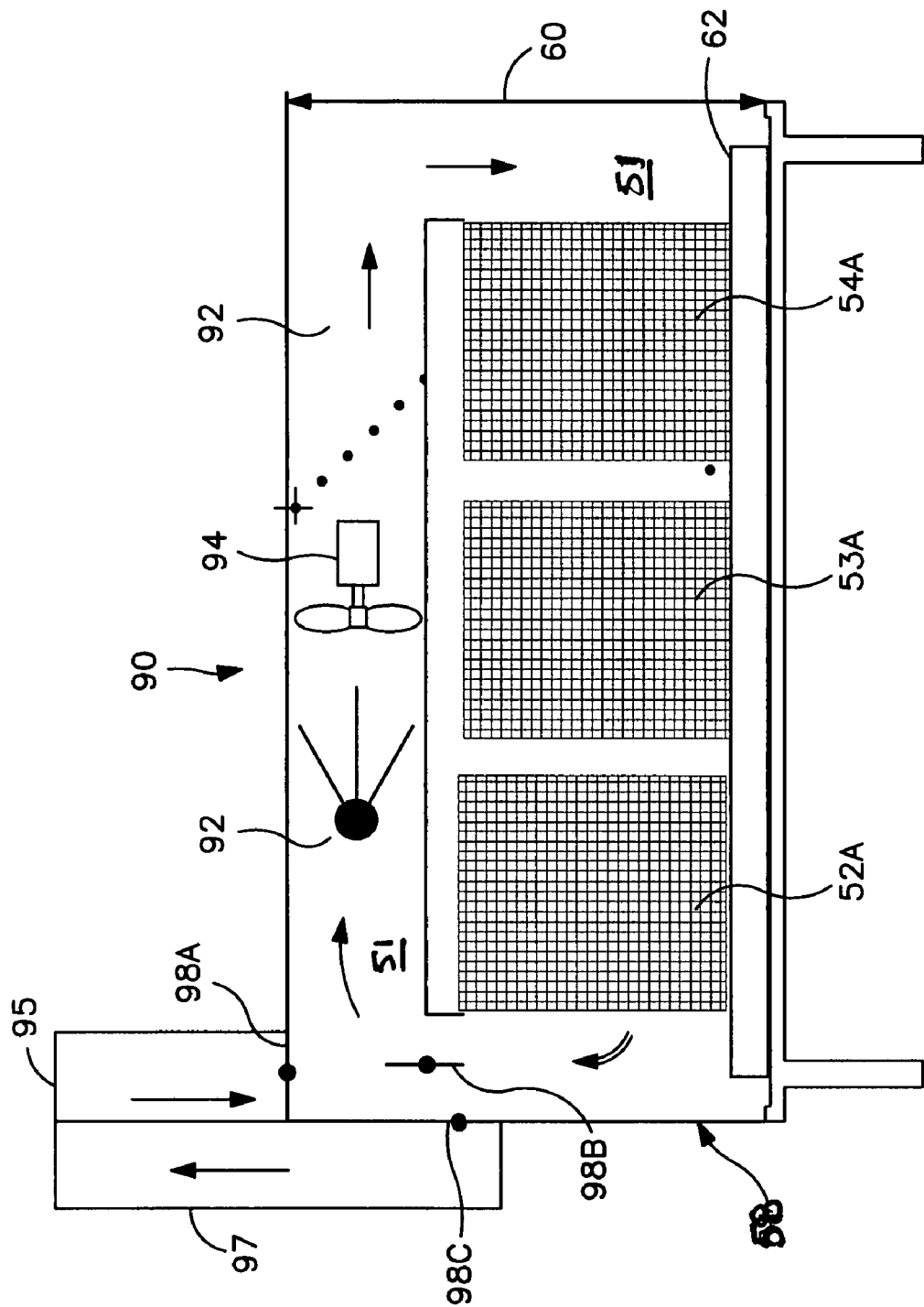
FIG. 4 is an illustration depicting the re-circulating gas flow thru the multi-unit stunning chamber in the stunning system of FIG. 3.

FIG. 4 is an illustration generally depicting the re-circulating gas flow thru the multi-unit stunning chamber in the controlled atmosphere stunning system of FIG. 3. As depicted therein, three modules or ranks of cages are positioned on a platform (62) or base of the stunning chamber housing (58). Although not shown, the three modules (52A,53A,54A) are loaded into the stunning chamber (51) via a front loading door.

FIG. 4 also shows another arrangement of the gas recirculation circuit (90), the stunning gas introduction subsystem (92) and recirculation fan (94) with the arrows represent the re-circulating gas flow thru the main stunning chamber (51) with three modules (52A,53A,54A) disposed therein and the recirculating circuit (90). Also shown are the fresh air make-up duct (95) and the exhaust duct (97) and the controlled dampers (98A,98B,98C) that govern the forced exhausting of the carbon dioxide from the stunning system. During module loading operations, the carbon dioxide introduction subsystem and the recirculation fan (94) are off or deactivated. Once the modules (52A,53A,54A) are loaded in the stunning chamber (51), the front loading door (56) is closed and sealed prior to the activation of the carbon dioxide introduction subsystem (92) and the recirculation fan (94). During the multi-phase stunning operation, the damper (98A) to the fresh air make-up duct remains closed while the recirculating damper (98B) is open. An exhaust flap (98C) is positioned between the exhaust duct (97) and the stunning chamber (51) in order to allow pressure within the stunning chamber (51) to be maintained within a desired range.

As is discussed in more detail below, the carbon dioxide concentration generally increases during each successive phase of the multi-phase stunning operation. Upon completion of the controlled stunning operation, the damper (98A) to the fresh air make-up duct (95) is opened and the recirculation damper (98B) is closed so as to divert the carbon dioxide gas to the exhaust duct (97) via the exhaust flap (98C). As soon as the carbon dioxide gas is evacuated from the stunning chamber (51), the side door (60) is opened and the modules (52A, 53A, 54A) are conveyed or otherwise advanced out of the stunning chamber (51) to a staging area (70) and subsequently to the tipper (80) for further processing of the stunned birds.

Figure 5:
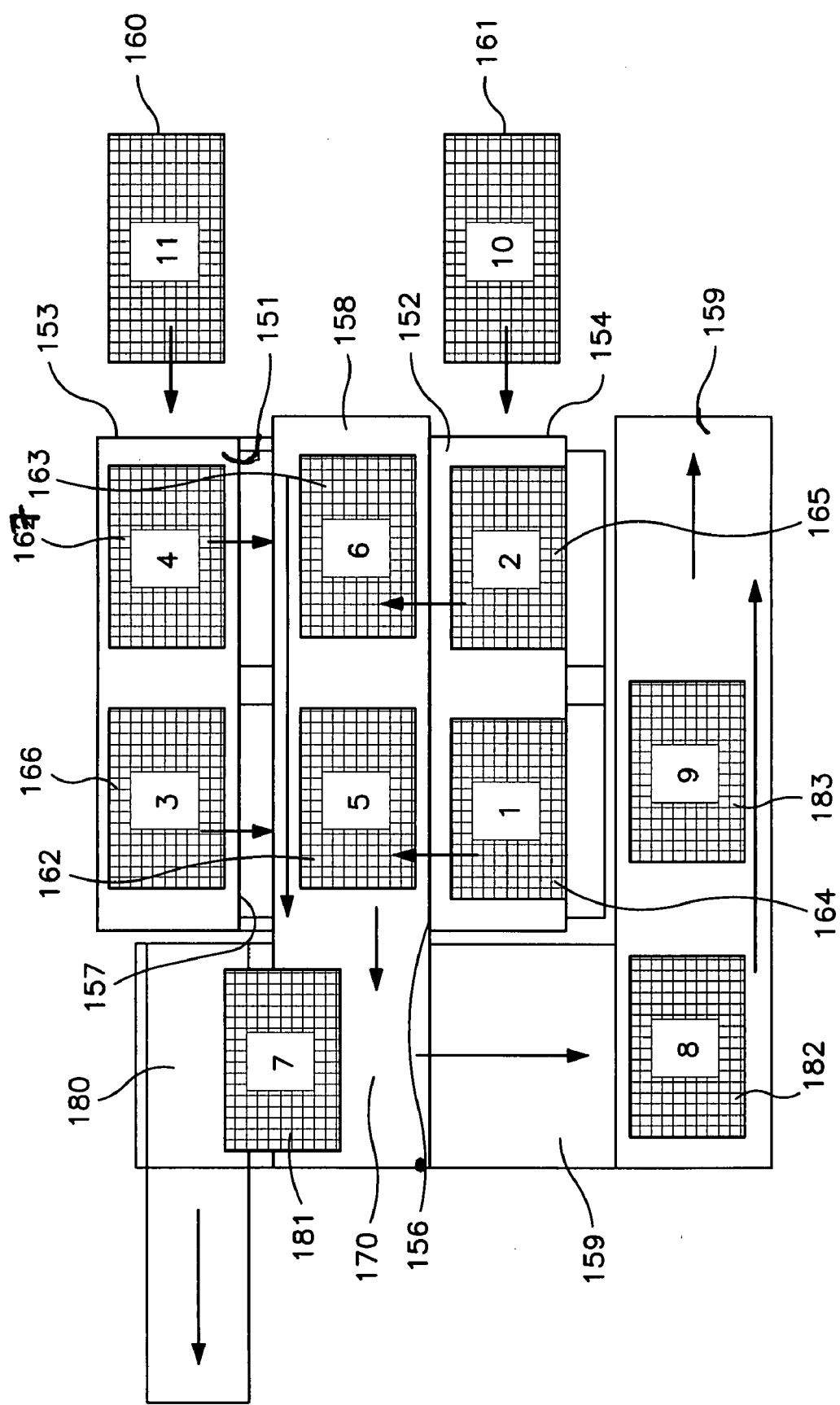
FIG. 5 is yet another schematic view of a multi-unit poultry stunning system employing multiple stunning chambers.

FIG. 5 is yet another schematic view of a multi-unit poultry stunning system employing multiple stunning chambers. The illustrated system includes two stunning chambers (151, 152) each of which allow loading of modules (160, 161) or ranks of cages via a front loading door (153, 154) and unloading of the modules (162, 163) or ranks of cages via a side door (155, 156) onto a first conveyor (158). The modules (162, 163) with the stunned birds exit the respective stunning chamber (151, 152) and move along the conveyor (158) to a staging area (170) and eventually to the tipper (180) or dumper where the birds are ejected or dumped for further processing. Upon completing the dumping or tipping process, the empty modules (181, 182, 183) return for possible re-use via a return conveyor system (159).

In the embodiment of FIG. 5, the stunning chambers (151, 152) are operating in a concurrent yet staggered mode. The staggered mode facilitates loading of a first stunning chamber (151) while the stunning operation is ongoing to the birds in the second stunning chamber (152). Upon completion of the stunning operation to the birds in the second stunning chamber (152), the modules (164, 165) containing the stunned birds exit the second stunning chamber via a side door (156) to the first conveyor system (158) while additional modules (161) containing live birds are loaded via the front loading door (154) into the second stunning chamber (152). During this sequence the first stunning chamber (151) is actively conducting stunning operations on the birds within the modules (166, 167) in the first stunning chamber (151).

The stunned birds from the second stunning chamber (152) move along the first conveyor (158) to a staging area (170) and eventually to the tipper (180) where the birds are dumped. After dumping the birds, the empty module (181) is returned via a second conveyor (159) for later use. Concurrently, the stunning operation to the birds in the first stunning chamber (151) is likely completed and the stunning chamber (151) is evacuated of any carbon dioxide. The modules (166, 167) containing the stunned birds exit the first stunning chamber (151) via a side door (155) to the first conveyor system (158) while additional modules (160) containing live birds are loaded via the front loading door (153) into the first stunning chamber (151). During this sequence the second stunning chamber (152) is actively conducting stunning operation on the birds. This parallel yet staggered process involving the two stunning chambers repeats continuously thereby allowing the batch stunning operation to appear similar to a continuous poultry stunning operation thereby improving productivity.

As can be appreciated from the above descriptions of the disclosed embodiments, the poultry stunning process generally comprises the following seven steps: (a) loading ranks of poultry cages or modules with live birds into a stunning chamber; (b) closing or otherwise sealing the stunning chamber to enclose the poultry therein, preferably in the dark; (c) recirculating the atmosphere within the stunning chamber using a fan or other air recirculating means, (d) introducing the stunning gas into the re-circulating atmosphere of the stunning chamber; (e) exhausting the isolated atmosphere and stunning gas; (f) opening the stunning chamber; and (g) unloading or advancing the modules from the stunning chamber to other post-stunning processes. More specifically, the introduction of the stunning gas (e.g. carbon dioxide) is preferably done in three, four or five stages, with each successive stage having a greater concentration of stunning gas. The above described stunning process is then repeated for live incoming birds. The post-stunning processes typically would include tipping or dumping the birds; shackling the birds; slitting, bleed-out, de-feathering, etc.

The length of time that is necessary for a stunning operation to render the poultry lethargic and the length of time necessary to reach unconsciousness or unrecoverable will depend on the gas being used, the gas concentration, the gas re-circulation rate, the type of poultry and its size. The actual gas concentrations and durations are preferably selected so as to minimize any adverse reactions of the poultry in the stunning chamber and promote the humane treatment of the birds.

In one example, large chickens having a weight of approximately 7 to 8 pounds are exposed to multiple levels or stages of carbon dioxide concentration including: (a) a first stage where carbon dioxide level is increased to slightly less than about 20 percent volume in air for a duration of about 40 seconds to anesthetize the poultry; (b) a second stage where carbon dioxide level is increased to about 40 percent volume in air for a duration of about 40 seconds to immobilize the poultry; and (c) a third stage where carbon dioxide level is increased to between about 50 and 55 percent volume in air for a duration of about 65 seconds such that the poultry reach an unrecoverable state.

In this example, approximately 60 seconds is allowed for the loading of the cages or modules into the stunning chamber. In addition, approximately 40 seconds is also allocated for exhausting the stunning chamber, replacing the oxygen-depleted atmosphere with fresh air as well as removing the cages or modules from the stunning chamber to the staging area. Collectively, the stunning operation, in this example, requires approximately 245 seconds to effectively stun multiple modules, with each module containing approximately 210 chickens.

Moreover, the size and capacity of the stunning chamber(s) can be selected to best match the downstream line speed or processing speed desired. In the above example, a three module stunning chamber would effectively stun 630 chickens in approximately 245 seconds which translates to an average of 150 chickens per minute. Also, the use of multiple stunning chambers operating in parallel allows the staggering of the stunning process to further increase the system capacity in excess of an average 200 chickens or more per minute while simulating a continuous process.

In a second example, chickens are exposed to a four stages of progressively increasing concentration of carbon dioxide gas including: (a) a first stage where carbon dioxide level is increased to slightly less than about 20 percent volume in air or less for a duration of about 60 seconds; (b) a second stage where carbon dioxide level is increased to about 30 percent volume in air for a duration of about 45 seconds; (c) a third stage where carbon dioxide level is increased to between about 40 percent volume in air for a duration of about 30 seconds; and (d) a carbon dioxide level of about 60 percent volume in air for a duration of about 100 seconds such that the poultry reach an unrecoverable state. The re-circulation flow rate of the carbon dioxide containing atmosphere was also increased between stage (a) and stage (d) by adjusting the fan speed. As with the first example, approximately 60 seconds is allowed for the loading of the modules into the stunning chamber and approximately 40 seconds is allocated for exhausting the stunning chamber, replacing the oxygen-depleted atmosphere with fresh air and removing the modules from the stunning chamber to the staging area. In this example, the overall carbon dioxide stunning operation requires approximately 335 seconds to effectively stun multiple modules, with each module containing approximately 210 or more chickens.

Again, the size and capacity of the stunning chamber(s) can be selected to best match the downstream line speed or processing speed desired. In this second example, a three module stunning chamber would effectively stun 630 or more chickens in approximately 335 seconds which translates to an average of about 120 chickens per minute. As with the earlier described example, the use of multiple stunning chambers operating in a staggered mode can further increase the total system capacity while simulating a continuous chicken stunning process.

A typical five step process would include: (a) a first stage where carbon dioxide level in the isolated atmosphere is increased to about 20 percent volume in air or less for a duration of about 60 seconds; (b) a second stage where carbon dioxide level is increased to between about 25 to 30 percent volume in air for a duration of about 60 seconds; (c) a third stage where carbon dioxide level is increased to between about 30 to 36 percent volume in air for a duration of about 60 seconds; (d) a carbon dioxide level between about 36 to 40 percent volume in air for a duration of about 60 seconds; and (e) a carbon dioxide level between about 50 to 60 percent volume in air for a duration of about 120 seconds such that the poultry reach an unrecoverable state. Approximately 30 seconds is allocated for exhausting the stunning chamber, replacing the oxygen-depleted atmosphere with fresh air and removing the modules from the stunning chamber to the staging area.

Referring back to FIG. 1 and FIG. 2, the poultry stunning control system (20) depicted therein is adapted to provide safe and efficient operation of the stunning system (10). Components of the poultry stunning control system (20) includes a control unit incorporating PLC, an operator interface and display, a plurality of operator buttons and switches. Operatively coupled to the poultry stunning control system is a carbon dioxide gas analyzer and associated sensors; and a plurality of gas valves, dampers, and fans that forcibly circulate selected gases through the isolated atmosphere and exhaust the isolated atmosphere from the stunning chamber upon completion of the stunning operation. Of particular importance to the control of the poultry stunning system (10) are the control of the carbon dioxide injection subsystem, the exhaust subsystem, and the loading/unloading doors.

The carbon dioxide injection subsystem, in conjunction with the control unit (20), delivers a controlled amount of carbon dioxide vapor to stun the poultry. The control unit (20) automatically adjusts the quantity of carbon dioxide and flow rate based on user inputs to match the changes experienced with size and quantity of poultry, and environmental conditions such as temperature and pressure. In the preferred embodiment, the poultry are exposed to multiple levels of carbon dioxide concentration to effectively stun them and minimize adverse reactions. In the preferred embodiment, the carbon dioxide is administered in three, four, or five stages. The actual times and carbon dioxide concentrations required for each stage may vary according to the poultry conditions and can be modified by the operator during set up or start up of the poultry stunning system (10).

The preferred carbon dioxide injection subsystem includes a source of carbon dioxide, a carbon dioxide circuit, and one or more injection devices. The preferred carbon dioxide circuit further includes one or more control valves, a flow meter, a pressure gauge, temperature sensors, a pressure regulator, pressure-relief devices, gas analyzer, and appropriate flow conduits and manifolds. In the preferred embodiment, the stunning system produces gaseous carbon dioxide by vaporizing liquid carbon dioxide from a bulk storage tank or other source of liquid carbon dioxide. The carbon dioxide vapor is passed to the carbon dioxide circuit via a main control valve. The main control valve is operatively coupled to the control unit and adapted to isolate the stunning system from the carbon dioxide supply and shut the flow of carbon dioxide under specific conditions, such as abnormal system pressures, adverse safety conditions, hazardous atmosphere conditions, and a user initiated emergency stop.

The flow rate, vapor temperature, supply pressure, and regulated pressure within the carbon dioxide circuit are monitored for abnormal conditions that would cause the system to alert the operator and, in some instances shut the flow of carbon dioxide and otherwise halt the stunning process. The volumetric flow of carbon dioxide is also measured to estimate carbon dioxide use per stunning cycle. Such information on the carbon dioxide injection system are collected are sent to the control unit for subsequent analysis and display.

The exhaust subsystem includes an exhaust blower and hazardous atmosphere monitors to remove carbon dioxide vapors from the stunning system and immediate surrounding area and safely directs the carbon dioxide vapors away from the process area. Preferably, the exhaust system and the hazardous atmosphere monitor must be activated for the stunning operation to proceed.

The present system and method provides noticeable benefits when compared to many current electric stunning operations. In particular, the present controlled atmosphere stunning with carbon dioxide provides a 1% to 3% reduction in broken wings of the chickens and no visible signs of bruising which translates to greater yield from the chicken processing. The above-described carbon-dioxide stunning system and process also appears to induce less stress to the chickens which translates to a 0.7% greater water pick-up during subsequent chilling processes and a higher pH level in the meat compared to electrically stunned chickens. Visual observation of the chickens during the three, four or five step stunning operations shows the chickens generally remain very calm. Finally, because the chickens are in an unrecoverable state as they are tipped or dumped there is a dramatic improvement in the productivity and work conditions in the chicken hang area. As a result, the present system and method of controlled atmosphere stunning represents a potential enabler or semi-automated or fully automated chicken shackling.

From the foregoing, it should be appreciated that the present invention thus provides a system and method for stunning poultry, such as chickens, with gas. While the invention herein disclosed has been described by means of specific embodiments and processes associated therewith, numerous modifications and variations can be made thereto by those skilled in the art without departing from the scope of the invention as set forth in the claims or sacrificing all its material advantages. For example, the present stunning system can be adapted to process varying sized cages or modules from as small as 20 chickens per module to 300 or more chickens per module. Also, the number of modules processed concurrently can also vary depending on the plant layout and downstream line processing speeds.

What is claimed is:

1. A method for controlled atmosphere stunning of poultry comprising the steps of:
   (i) loading one or more batches of poultry confined in cages in a stunning chamber having an entrance and exit and one or more doors to seal the entrance and exit;

(ii) closing the door to the stunning chamber to sealably enclose the one or more batches of poultry in the stunning chamber to isolate the atmosphere proximate the poultry;

(iii) introducing a gaseous mixture to the isolated atmosphere and forcibly recirculating the gaseous mixture within the stunning chamber while the cages are stationary to stun the one or more batches of poultry;

(iv) forcibly exhausting the gaseous mixture used to stun the poultry from the isolated atmosphere in the sealed stunning chamber to a surrounding atmosphere; and (v) opening the door and advancing the stunned poultry confined in cages from the stunning chamber.

2. The method of claim 1 wherein the step of introducing the gaseous mixture to the isolated atmosphere further comprises:

introducing the gaseous mixture to the isolated atmosphere at a first concentration level and forcibly recirculating the isolated atmosphere within the stunning chamber for a first prescribed duration;

introducing additional gaseous mixture to the isolated atmosphere to a second concentration level and forcibly recirculating the isolated atmosphere around the stunning chamber for a second prescribed duration; and introducing additional gaseous mixture to the isolated atmosphere to a third concentration and forcibly recirculating the isolated atmosphere around the stunning chamber for a third prescribed duration sufficient to bring the poultry to an unrecoverable state.

3. The method of claim 1 wherein the gaseous mixture introduced into the isolated atmosphere comprises carbon dioxide.

4. The method of claim 1 wherein the poultry are chickens and each batch of chickens include at least 20 chickens.

5. The method of claim 1 further comprising the step of loading additional batches of poultry into the stunning chamber as the stunned poultry are advanced from the stunning chamber to a further processing area.

6. The method of claim 1 wherein the step of sealably enclosing the one or more batches of poultry in the stunning chamber further comprises enclosing the poultry in the dark.

7. The method of claim 1 further comprising at least two stunning chambers and wherein said batches of poultry in the first stunning chamber are being stunned concurrently with the loading of batches of poultry in the second stunning chamber.

8. The method of claim 1 further comprising at least two stunning chambers and wherein said batches of poultry in the first stunning chamber are being advanced from the first stunning chamber to the processing area concurrently with the stunning of batches of poultry in a second stunning chamber.

9. A system for controlled atmosphere stunning a batch of caged poultry comprising:

a non-conveyorized stunning chamber having an entrance and an exit and one or more doors to seal the entrance and exit, the stunning chamber defining an isolated atmosphere that is sealed from the surrounding atmosphere when the doors are closed;

a gas introduction subsystem adapted to introduce prescribed levels of carbon dioxide into the isolated atmosphere in the sealed stunning chamber;

an atmosphere re-circulating subsystem adapted to forcibly recirculate the carbon dioxide in the isolated atmosphere within the sealed stunning chamber for a prescribed duration to stun the batch of caged poultry;

an exhaust subsystem adapted to forcibly evacuate the carbon dioxide from the sealed stunning chamber to a surrounding atmosphere after the poultry have been stunned; and a control system adapted to control the operation of the atmosphere recirculating subsystem, the gas introduction subsystem, and the exhaust subsystem.

* * * * *